US011805236B2

(12) United States Patent
Watson et al.

(10) Patent No.: US 11,805,236 B2
(45) Date of Patent: Oct. 31, 2023

(54) GENERATING STEREO IMAGE DATA FROM MONOCULAR IMAGES

(71) Applicant: Niantic, Inc., San Francisco, CA (US)

(72) Inventors: James Watson, London (GB); Oisin MacAodha, London (GB); Daniyar Turmukhambetov, London (GB); Gabriel J. Brostow, London (GB); Michael David Firman, London (GB)

(73) Assignee: NIANTIC, INC., San Francisco, CA (US)

( * ) Notice: Subject to any disclaimer, the term of this patent is extended or adjusted under 35 U.S.C. 154(b) by 234 days.

(21) Appl. No.: 17/317,619

(22) Filed: May 11, 2021

(65) Prior Publication Data

US 2021/0352261 A1    Nov. 11, 2021

Related U.S. Application Data

(60) Provisional application No. 63/023,247, filed on May 11, 2020.

(51) Int. Cl.
*H04N 13/268* (2018.01)
*G06T 7/50* (2017.01)
(Continued)

(52) U.S. Cl.
CPC ......... *H04N 13/268* (2018.05); *A63F 13/525* (2014.09); *G06T 3/0093* (2013.01);
(Continued)

(58) Field of Classification Search
CPC .. H04N 13/261; H04N 13/128; H04N 13/271; H04N 2013/0081; H04N 13/122;
(Continued)

(56) References Cited

U.S. PATENT DOCUMENTS 9,111,350 B1 *  8/2015  Mukherjee .............. G06T 15/00
9,609,307 B1    3/2017  Lopez et al.
(Continued)

FOREIGN PATENT DOCUMENTS

CN    104813669 B    5/2018
CN    111047634 A    4/2020
(Continued)

OTHER PUBLICATIONS

Koch, Tobias, et al. "Evaluation of cnn-based single-image depth estimation methods." Proceedings of the European Conference on Computer Vision (ECCV) Workshops. 2018 (Year: 2018).*
(Continued)

*Primary Examiner* — Xiao M Wu
*Assistant Examiner* — Scott E Sonners
(74) *Attorney, Agent, or Firm* — FENWICK & WEST LLP (57) ABSTRACT

A computer system generates stereo image data from monocular images. The system generates depth maps for single images using a monocular depth estimation method. The system converts the depth maps to disparity maps and uses the disparity maps to generate additional images forming stereo pairs with the monocular images. The stereo pairs can be used to form a stereo image training data set for training various models, including depth estimation models or stereo matching models.

44 Claims, 6 Drawing Sheets

(51) Int. Cl.
  *G06T 3/00*   (2006.01)
  *G06T 5/00*   (2006.01)
  *G06T 5/50*   (2006.01)
  *A63F 13/525* (2014.01)
  *H04N 13/128* (2018.01)

(52) U.S. Cl.
  CPC ............... *G06T 5/005* (2013.01); *G06T 5/50* (2013.01); *G06T 7/50* (2017.01); *H04N 13/128* (2018.05); *A63F 2300/8082* (2013.01); *G06T 2207/10012* (2013.01); *G06T 2207/20081* (2013.01); *G06T 2207/20084* (2013.01)

(58) Field of Classification Search
  CPC . G06T 2207/20081; G06T 2207/20084; G06T 7/593; G06T 7/50; G06T 2207/10028; G06T 2207/20228; G06T 19/006; G06T 3/0093; G06T 2207/20076; G06N 3/045; G06N 3/08
  See application file for complete search history.

(56) References Cited

U.S. PATENT DOCUMENTS

| | | | |
|---|---|---|---|
| 9,736,449 B1* | 8/2017 | Fan | H04N 13/128 |
| 2013/0147911 A1 | 6/2013 | Karsch et al. | |
| 2017/0085863 A1* | 3/2017 | Lopez | H04N 13/261 |
| 2018/0211401 A1 | 7/2018 | Lee et al. | |
| 2020/0090359 A1* | 3/2020 | Pillai | G06V 10/82 |

FOREIGN PATENT DOCUMENTS

| | | |
|---|---|---|
| CN | 111127401 A | 5/2020 |
| KR | 10-1370718 B1 | 3/2014 |
| KR | 10-2015-0032714 A | 3/2015 |
| KR | 10-2015-0058457 A | 5/2015 |
| TW | 202008310 A | 2/2020 |

OTHER PUBLICATIONS

Flynn, John, et al. "Deepstereo: Learning to predict new views from the world's imagery." Proceedings of the IEEE conference on computer vision and pattern recognition. 2016. (Year: 2016).*

Curti, Salvatore, Daniele Sirtori, and Filippo Vella. "3D effect generation from monocular view." Proceedings. First International Symposium on 3D Data Processing Visualization and Transmission. IEEE, 2002. (Year: 2002).*

Xie, Junyuan, Ross Girshick, and Ali Farhadi. "Deep3d: Fully automatic 2d-to-3d video conversion with deep convolutional neural networks." Computer Vision—ECCV 2016: 14th European Conference, Amsterdam, The Netherlands, Oct. 11-14, 2016, Proceedings, Part IV 14. Springer Intern'l Publishing, 2016 (Year: 2016).*

Luo, Yue, et al. "Single view stereo matching." Proceedings of the IEEE Conference on Computer Vision and Pattern Recognition. 2018 (Year: 2018).*

Watson, Jamie, et al. "Learning stereo from single images." Computer Vision—ECCV 2020: 16th European Conference, Glasgow, UK, Aug. 23-28, 2020, Proceedings, Part I 16. Springer International Publishing, 2020. (Year: 2020).*

PCT International Search Report and Written Opinion, PCT Application No. PCT/IB2021/054030, dated Aug. 18, 2021, nine pages.

Taiwan Intellectual Property Administration, Office Action, TW Patent Application No. 110116994, dated Dec. 23, 2021, 17 pages.

* cited by examiner

GENERATING STEREO IMAGE DATA FROM MONOCULAR IMAGES

CROSS-REFERENCE TO RELATED APPLICATIONS

This application claims the benefit of U.S. Provisional Application No. 63/023,247, filed on May 11, 2020, each of which is incorporated by reference in its entirety.

BACKGROUND

1. Technical Field

The subject matter described relates generally to machine vision, and in particular to generating stereo image data from monocular images.

2. Problem

Stereo image data is used for a variety of image processing tasks, including stereo matching. Stereo matching is the process of determining the per-pixel displacement (i.e., disparity) between the images in a stereo pair. Various approaches have been employed for stereo matching, with trained deep networks being one of the more successful examples. However, these conventional deep networks have required training using a large amount of ground truth data. That is, stereo pairs of images for which the per-pixel displacement is known. Generating this ground truth data can be expensive and inconvenient. For example, one approach generates ground truth data by assessing scenes with LiDAR scanners. One alternative is to train models using synthetic datasets (e.g., generated by 3D animation software). However, for such models to be deployed in novel real-world scenes, this typically requires significant fine tuning with additional correspondence data from the target domain. Thus, there is a need for novel sources of stereo images that are suitable for training stereo matching models or other models trained using stereo image data.

SUMMARY

A computer system generates stereo image data from monocular images. The system generates depth maps for monocular images using a monocular depth estimation method, such as by using a trained monocular depth estimation model. The system converts the depth maps to disparity maps, and uses the disparity maps to generate additional images forming stereo pairs with the monocular images. For instance, the system may generate the additional images by forward warping the single images using a corresponding disparity map. The stereo pairs can be used to generate a stereo image training data set for training various types of models, such as a depth estimation model or stereo matching model. Generating stereo training data in this manner makes it possible to convert a collection of single RGB images into stereo image pairs that may be used as training data. This approach reduces human effort relative to conventional methods by reducing reliance on collecting real depths or using hand-designed synthetic training data.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining depth information from image data is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
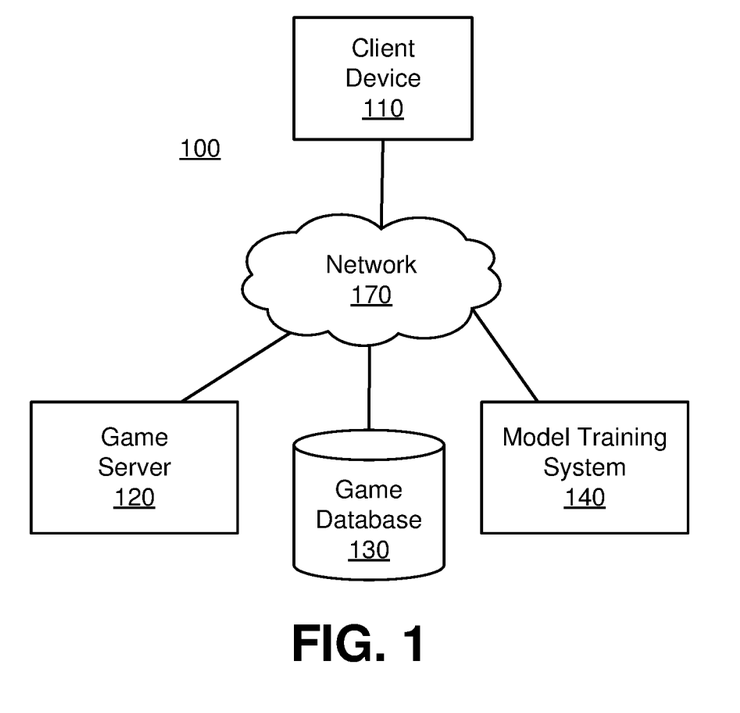
FIG. 1 is a block diagram of a networked computing environment suitable for hosting a parallel reality game, according to one embodiment.

FIG. 1 illustrates one embodiment of a networked computing environment 100 suitable for providing a parallel reality game. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The networked computing environment 100 uses a client-server architecture, where a game server 120 communicates with a client device 110 over a network 170 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 170. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet. Various embodiments of the client device 110 are described in greater detail below, with reference to FIG. 2.

The game server 120 can be any computing device and can include one or more processors and one or more computer-readable storage media. The computer-readable storage media can store instructions which cause the processor to perform operations. In various embodiments, the game server 120 maintains a copy of a master game state and manages interactions between client devices 110 of players such that all of the players interact with a consistent game world.

The game server 120 can be configured to receive requests for game data from a client device 110 (for instance via remote procedure calls (RPCs)) and to respond to those requests via the network 170. For instance, the game server 120 can encode game data in one or more data files and provide the data files to the client device 110. In addition, the game server 120 can be configured to receive game data (e.g. player positions, player actions, player input, etc.) from a client device 110 via the network 170. For instance, the client device 110 can be configured to periodically send player input and other updates to the game server 120, which the game server 120 uses to update game data in the game database 130 to reflect any and all changed conditions for the game. Various embodiments of the game server 120 are described in greater detail below, with reference to FIG. 3.

The game server 120 can include or can be in communication with a game database 130. The game database 130 stores game data used in the parallel reality game to be served or provided to the client device(s) 110 over the network 170. The game data stored in the game database 130 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 130 can be populated either offline or in real time by system administrators or by data received from users/players of the game, such as from a client device 110 over the network 170.

The model training system 140 trains one or more models used to provide game features or content. In one embodiment, the model training system 140 trains a depth estimation model to build depth maps from a single input image. The model may be trained using stereoscopic training data, video training data (which approximates true stereo data), or a combination of both. In the same or different embodiment, the mode training system 140 trains a stereo matching model to determine per-pixel horizontal displacement between a pair of stereo images. In these or other embodiments, model training system 140 generates stereo image data from single input images, such as to use for training a depth estimation model or a stereo matching model. Various embodiments of the model training system are described in greater detail below, with reference to FIG. 4.

The network 170 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 2:
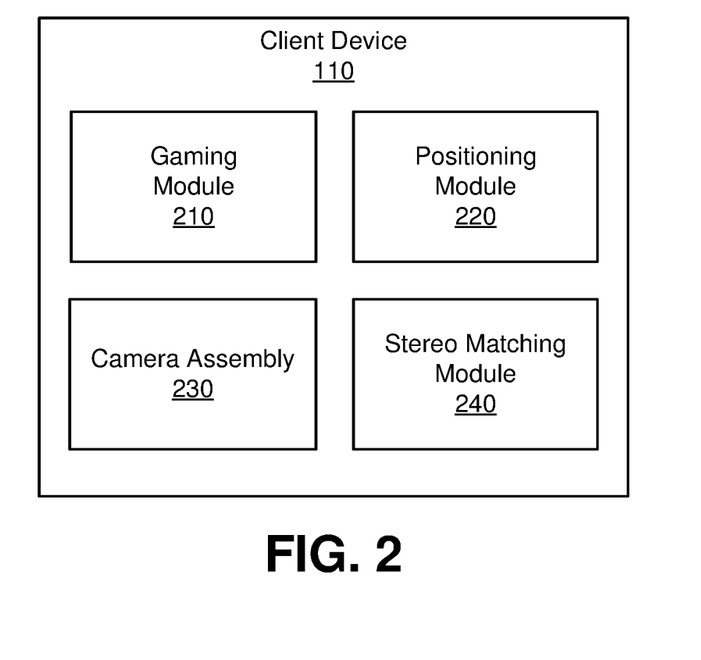
FIG. 2 is a block diagram of the client device of FIG. 1, according to one embodiment.

FIG. 2 illustrates one embodiment of a client device 110. In the embodiment shown, the client device 110 includes a gaming module 210, a positioning module 220, a camera assembly 230, and a stereo matching module 240. In other embodiments, a client device 110 may include different or additional elements. Furthermore, the functionality may be distributed among the elements in different way than described.

The gaming module 210 provides a player with an interface to participate in the parallel reality game. The game server 120 transmits game data over the network 170 to the client device 110 for use by the gaming module 210 to provide local versions of the game to players at locations remote from the game server 120. In one embodiment, the gaming module 210 presents a user interface on a display device associated with the client device 110 that displays a virtual world (e.g. renders imagery of the virtual world) associated with the game and allows a user to interact in the virtual world to perform various game objectives. In some embodiments, the gaming module 210 presents image data from the real world (e.g., captured by the camera assembly 230) augmented with virtual elements from the parallel reality game. In these embodiments, the gaming module 210 may generate virtual content or adjust virtual content according to other information received from other components of the client device 110. For example, the gaming module 210 may adjust a virtual object to be displayed on the user interface according to a depth map of the scene captured in the image data (e.g., as generated by a depth estimation model).

The gaming module 210 can also control various other outputs to allow a player to interact with the game without requiring the player to view a display screen. For instance, the gaming module 210 can control various audio, vibratory, or other notifications that allow the player to play the game without looking at the display screen. The gaming module 210 can access game data received from the game server 120 to provide an accurate representation of the game to the user. The gaming module 210 can receive and process player input and provide updates to the game server 120 over the network 170. The gaming module 210 may also generate or adjust game content to be displayed by the client device 110. For example, the gaming module 210 may generate a virtual element based on depth information (e.g., as determined by a depth estimation model applied to one or more images captured by the camera assembly 230).

The positioning module 220 can be any device or circuitry for monitoring the position of the client device 110. For example, the positioning module 220 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 220 may further include various other sensors that may aid in accurately positioning the client device 110 location.

As the player moves around with the client device 110 in the real world, the positioning module 220 tracks the position of the player and provides the player position information to the gaming module 210. The gaming module 210 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 210 can provide player position information to the game server 120 over the network 170. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The camera assembly 230 includes one or more cameras configured to capture images of the physical environment in which the client device 110 is located. The portion of the physical environment depicted in an image is referred to as a scene. The camera assembly 230 captures image data corresponding to the scene and stores it in a storage medium of the client device. Additionally or alternatively, the image data may be sent to the game server 120 via the network 170. The camera assembly 230 may utilize a variety of varying photo sensors with varying color capture ranges at varying capture rates. The camera assembly 230 may contain a wide-angle lens or a telephoto lens. The camera assembly 230 may be configured to capture single images or video as the image data. The client device 110 may also include other sensors for recording data about the client device's physical environment, such as accelerometers, gyroscopes, inertial measurement units (IMUs), barometers, thermometers, light sensors, microphones, etc. The image data can be appended with metadata describing other details of the image data including sensory data (e.g. temperature, brightness of environment) or capture data (e.g. exposure, warmth, shutter speed, focal length, capture time, etc.).

The stereo matching module 240 takes a stereo pair of images and determines the per-pixel horizontal displacement (i.e., disparity) between pixels in the left image to the right image, or vice versa. The stereo pair may be captured by a pair of cameras on the client device 110 or a pair of cameras on different client devices 110 (e.g., the client device with the stereo matching module 240 and a second camera device) with known positions relative to each other. Alternatively, the stereo pair may be a pair of frames in a video captured by a single camera.

In various embodiments, the stereo matching module 240 applies a stereo matching model (e.g., as trained by the model training system 140) to generate a mapping indicating how the pixels of one image translate onto the pixels of the other image in the pair. This mapping may be used to provide augmented reality content. For example, for a client device 110 with two or more cameras that capture overlapping portions of a scene, the stereo matching model may be used to obtain a greater understanding of the portion(s) of scene captured by two or more cameras such that augmented reality content (e.g., an AR character) interacts with the scene in a more realistic manner. Various approaches to training such a model are described in greater detail below, with reference to FIG. 4. Furthermore, the client device 110 may include a depth estimation model (e.g., a machine learning model, trained by the model training system 140) for estimating the distance between the camera assembly 230 and the physical object corresponding to each pixel in an image.

Figure 3:
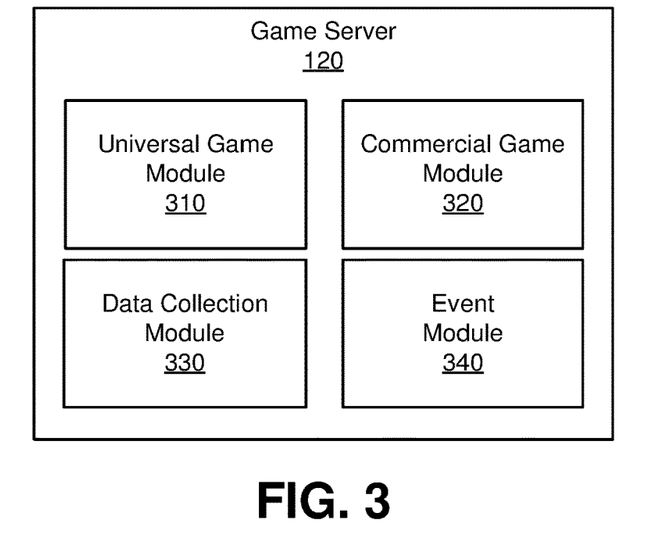
FIG. 3 is a block diagram of the game server of FIG. 1, according to one embodiment.

FIG. 3 illustrates one embodiment of the game server 120. In the embodiment shown, the game server 120 includes a universal gaming module 310, a commercial game module 320, a data collection module 330, and an event module 340. As mentioned above, the game server 120 interacts with a game database 130 that may be part of the game server 120 or accessed remotely (e.g., the game database 130 may be a distributed database accessed via the network 170). In other embodiments, the game server 120 contains different or additional elements. In addition, the functions may be distributed among the elements in a different manner than described. For instance, the game database 130 can be integrated into the game server 120.

The universal game module 310 hosts the parallel reality game for all players and acts as the authoritative source for the current status of the parallel reality game for all players. As the host, the universal game module 310 generates game content for presentation to players, e.g., via their respective client devices 110. The universal game module 310 may access the game database 130 to retrieve or store game data when hosting the parallel reality game. The universal game module 310 also receives game data from client device 110 (e.g. depth information, player input, player position, player actions, landmark information, etc.) and incorporates the game data received into the overall parallel reality game for all players of the parallel reality game. The universal game module 310 can also manage the delivery of game data to the client device 110 over the network 170. The universal game module 310 may also govern security aspects of client device 110 including but not limited to securing connections between the client device 110 and the game server 120, establishing connections between various client device 110, and verifying the location of the various client device 110.

The commercial game module 320, in embodiments where one is included, can be separate from or a part of the universal game module 310. The commercial game module 320 can manage the inclusion of various game features within the parallel reality game that are linked with a commercial activity in the real world. For instance, the commercial game module 320 can receive requests from external systems such as sponsors/advertisers, businesses, or other entities over the network 170 (via a network interface) to include game features linked with commercial activity in the parallel reality game. The commercial game module 320 can then arrange for the inclusion of these game features in the parallel reality game.

The data collection module 330, in embodiments where one is included, can be separate from or a part of the universal game module 310. The data collection module 330 can manage the inclusion of various game features within the parallel reality game that are linked with a data collection activity in the real world. For instance, the data collection module 330 can modify game data stored in the game database 130 to include game features linked with data collection activity in the parallel reality game. The data collection module 330 can also analyze and data collected by players (e.g., as part of a crowd-sourcing effort) and provide the data for access by various platforms. To provide a specific example, players may be prompted to submit photographs of landmarks and other features of interest in their environment and the data collection module 330 may incorporate virtual elements corresponding to the real-world landmarks or features into the parallel reality game based on player submissions (e.g., subject to verifying that the landmark exists and is located where the submitting player indicated).

The event module 340 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

Figure 4:
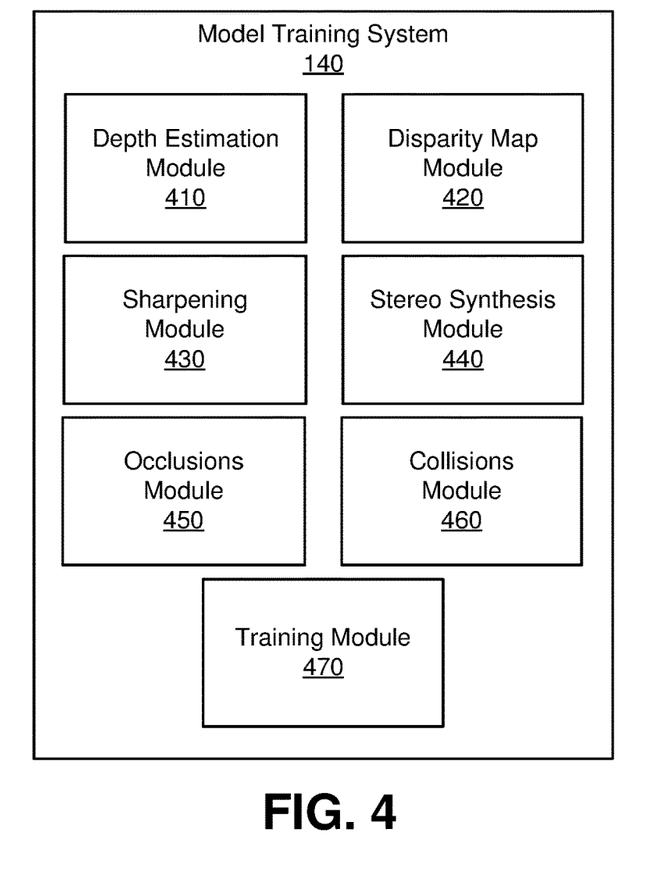
FIG. 4 is a block diagram of the model training system of FIG. 1, according to one embodiment.

FIG. 4 illustrates one embodiment of the model training system 140, which is configured to generate stereo images from monocular images (e.g., for use in training a stereo matching or depth estimation model). In the embodiment shown, the model training system 140 includes a depth estimation module 410, a disparity map module 420, a sharpening module 430, a stereo synthesis module 440, an occlusions module 450, a collisions module 460, and a training module 470. In other embodiments, the model training system 140 contains different or additional elements. In addition, the functions may be distributed among the elements in a different manner than described.

The depth estimation module 410 applies a monocular depth estimation model (e.g., a neural network) to an input image to generate a depth map of that image. The monocular depth estimation model may be an off-the-shelf model or a specially trained custom model. In one embodiment, the depth map includes an estimated depth for each pixel in the input image.

The disparity map module 420 converts the depth map generated by the depth estimation module 410 into a disparity map. Disparity is inversely proportional to depth, and any suitable method of converting from one to the other may be used. In some embodiments, the disparity map module 420 converts the depth map to a disparity map by applying a disparity estimation function that simulates a range of possible types of baseline methods for determining the depth map or camera focal lengths. In one embodiment, the disparity map module 420 uses the following disparity estimation function to determine the disparity map using the depth map:

$$D = s\left(\frac{Z_{max}}{Z}\right)$$

Where D is the disparity map, Z is the depth map, $Z_{max}$ is a maximum depth map (e.g., depth values of one if depth is a proportional value measured from zero to one), and s is a scaling factor randomly sampled from a range over a minimum disparity value to a maximum disparity value. The minimum and maximum disparity values ensure that the generated disparity values are within a plausible range and may be determined using various techniques, such as by using predefined values.

The sharpening module 430, if included, applies a sharpening process to correct for blurry edges in the depth map generated by the depth estimation module 410. In one embodiment, the sharpening module 430 applies the sharpening process to the disparity map generated by the disparity map module 420. In particular, the sharpening module 430 adjusts flying pixels identified in the disparity map, where flying pixels are pixels with inaccurate disparity values resulting from being positioned between pixels representing depth surfaces (e.g., physical objects in the scene. For instance, flying pixels may have disparity values indicative of a depth surface where there should actually be empty space due to being between pixels corresponding to two or more depth surfaces that are actually in the scene. In one embodiment, the sharpening module 430 identifies flying pixels in the disparity map as those for which a response of a Sobel edge filter is greater than a threshold (e.g., three). The disparity value of a flying pixel may be set based on the disparity value of one or more non-flying pixels in the disparity map, such as the nearest non-flying pixel in the disparity map to the flying pixel. The disparity value of the flying pixel may be adjusted using various techniques, such as setting the disparity value of the flying pixel equal to the disparity value of the non-flying pixel or an average disparity value of multiple non-flying pixels. This sharpening process results in sharper edges in the disparity map by eliminating some or all of the flying pixels. In the same or different embodiments, the sharpening module 430 applies a sharpening process directly to the depth map before using the depth map to generate the disparity map.

The stereo synthesis module 440 generates an artificial second image to form a stereo pair with the input image by transforming the input image based on the disparity map. For example, the input image can be considered a left image and the artificial image is an estimate of a right image that would be generated by a hypothetical second camera at a fixed distance to the right from the camera that captured the input image. Similarly, the input image could be considered a right image and the artificial image is an estimate of a left image. In some embodiments, the stereo synthesis module 440 generates the artificial second image by forward warping pixels in the input image according to the determined disparity map. The stereo synthesis module 440 may translate a pixel in the input image by some number of pixels to the left or right according to a disparity value corresponding to the input pixel in the disparity map. For example, if the disparity value in the disparity map corresponding to a pixel in the input image was five, then the stereo synthesis module may warp the pixel to a position five pixels to the right or left in the second image. In other cases, the stereo synthesis module 440 may use other wide transformations to forward warp the pixels.

The occlusions module 450 corrects for occlusion holes that result from the forward warping process. Occlusion holes are regions of the generated image to which no pixels are warped from the input image because they are occluded behind an object from the perspective of the camera in the input image. In one embodiment, the occlusions module 450 fills occlusion holes in generated images using a texture from an additional image or from another region of the input image. If an additional image is used to fill occlusion holes, the additional image may by another image in the training set. The additional image may be selected from the training set using various techniques, such as random selection or image having a threshold similarity to the input image according to one or more image similarity metrics. The color of pixels in the texture used to fill the occlusion holes may be adjusted to match the overall profile of the generated image, such as by using a color transfer process from the input image to the image from which the texture is obtained.

The collisions module 460 resolves pixel conflicts resulting from multiple pixels of the input image warping to the same pixel location in the generated image. The collisions module 460 may resolve such pixel conflicts by selecting one pixel from among multiple conflicting pixels to use for the generated image. In one embodiment, the collisions module 460 selects a pixel among conflicting pixels that corresponds to the greatest disparity value in the disparity map relative to the other conflicting pixels, as the greatest disparity value is indicative of the shortest depth (i.e., being closest to the camera). In other embodiments different techniques may be used to select a pixel from multiple pixels of the input image or otherwise resolve pixel conflicts.

The training module 470 uses stereo image pairs generated from monocular images using the above techniques to train one or more models. In particular, the training module 470 may generate a training set of stereo image pairs including stereo images and ground truth per-pixel horizontal displacement values between the stereo images. The training module 470 may use the training set of stereo image pairs to train a stereo matching model to predict per-pixel horizontal displacements given a stereo image pair. For instance, the training module 470 may train a deep stereo matching network. In the same or different embodiments, the training module 470 may use stereo image pairs to train other types of models, such as monocular or stereo depth estimation models. For example, the training module 470 may use self-supervised or semi-supervised training techniques to train a depth estimation model using the set of stereo images. In this way, stereo training data can be generated without the expense or complications of capturing stereo images, using lidar to get ground truth depth data, or the like. Additionally or alternatively, stereo pairs generated in this way may be used to supplement other forms of training data.

Exemplary Parallel-Reality Game

Figure 5:
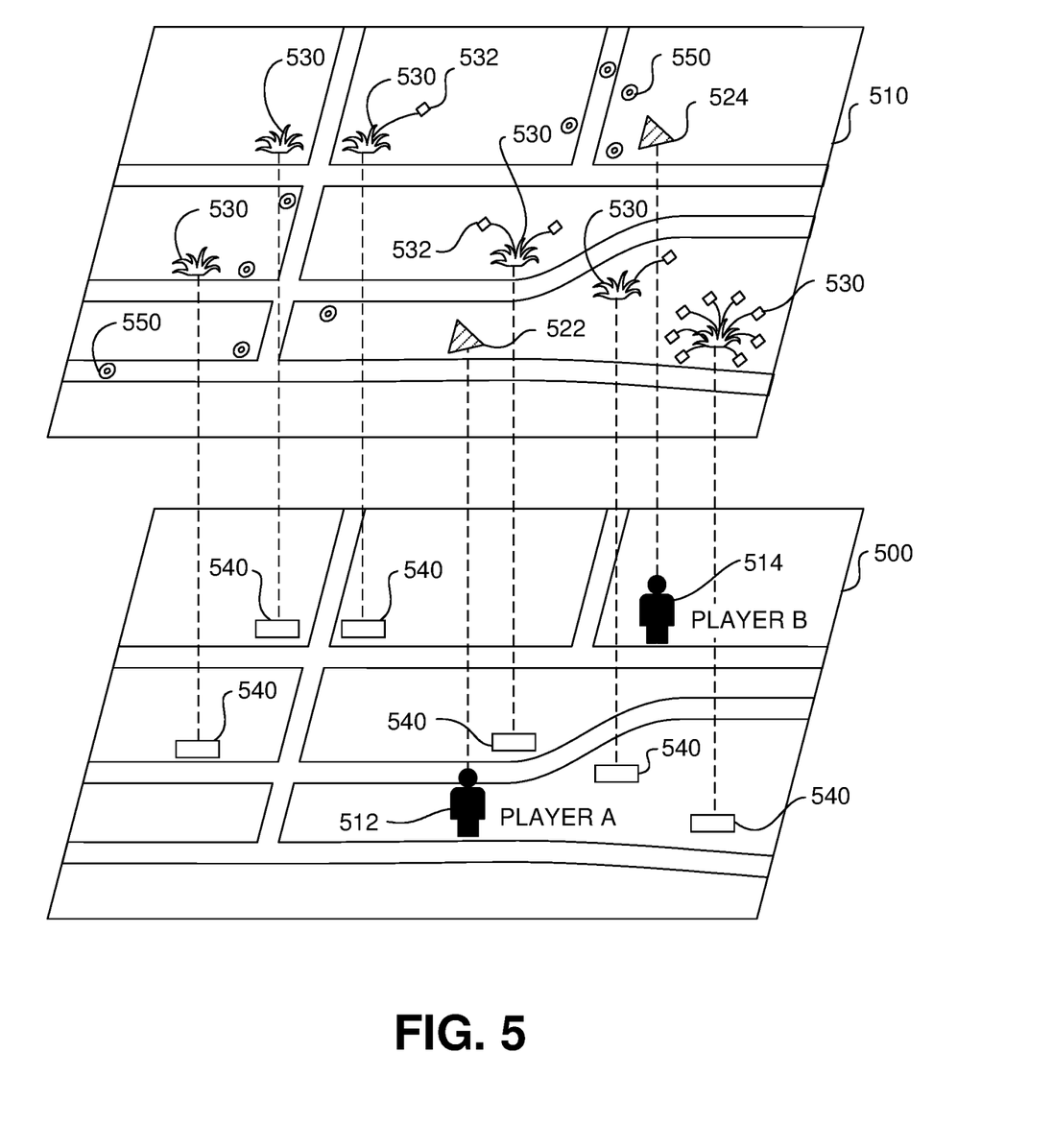
FIG. 5 depicts a representation of a virtual world having a geography that parallels the real world, according to one embodiment.

FIG. 5 depicts a conceptual diagram of a virtual world 510 that parallels the real world 500 that can act as the game board for players of a parallel reality game, according to one embodiment. As illustrated, the virtual world 510 can include a geography that parallels the geography of the real world 500. In particular, a range of coordinates defining a geographic area or space in the real world 500 is mapped to a corresponding range of coordinates defining a virtual space in the virtual world 510. The range of coordinates in the real world 500 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 510 corresponds to the player's position in the real world 500. For instance, the player A located at position 512 in the real world 500 has a corresponding position 522 in the virtual world 510. Similarly, the player B located at position 514 in the real world has a corresponding position 524 in the virtual world. As the players move about in a range of geographic coordinates in the real world, the players also move about in the range of coordinates defining the virtual space in the virtual world 510. In particular, a positioning system (e.g., a GPS system) associated with a mobile computing device carried by the player can be used to track a player's position as the player navigates the range of geographic coordinates in the real world. Data associated with the player's position in the real world 500 is used to update the player's position in the corresponding range of coordinates defining the virtual space in the virtual world 510. In this manner, players can navigate along a continuous track in the range of coordinates defining the virtual space in the virtual world 510 by simply traveling among the corresponding range of geographic coordinates in the real world 500 without having to check in or periodically update location information at specific discrete locations in the real world 500.

The location-based game can include a plurality of game objectives requiring players to travel to or interact with various virtual elements or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements or objects at the specific location to achieve or perform one or more game objectives.

For example, a game objective has players interacting with virtual elements 530 located at various virtual locations in the virtual world 510. These virtual elements 530 can be linked to landmarks, geographic locations, or objects 540 in the real world 500. The real-world landmarks or objects 540 can be works of art, monuments, buildings, businesses, libraries, museums, or other suitable real-world landmarks or objects. Interactions include capturing, claiming ownership of, using some virtual item, spending some virtual currency, etc. To capture these virtual elements 530, a player must travel to the landmark or geographic location 540 linked to the virtual elements 530 in the real world and must perform any necessary interactions with the virtual elements 530 in the virtual world 510. For example, player A may have to travel to a landmark 540 in the real world 500 in order to interact with or capture a virtual element 530 linked with that particular landmark 540. The interaction with the virtual element 530 can require action in the real world, such as taking a photograph or verifying, obtaining, or capturing other information about the landmark or object 540 associated with the virtual element 530.

Game objectives may require that players use one or more virtual items that are collected by the players in the location-based game. For instance, the players may travel the virtual world 510 seeking virtual items (e.g. weapons, creatures, power ups, or other items) that can be useful for completing game objectives. These virtual items can be found or collected by traveling to different locations in the real world 500 or by completing various actions in either the virtual world 510 or the real world 500. In the example shown in FIG. 5, a player uses virtual items 532 to capture one or more virtual elements 530. In particular, a player can deploy virtual items 532 at locations in the virtual world 510 proximate or within the virtual elements 530. Deploying one or more virtual items 532 in this manner can result in the capture of the virtual element 530 for the particular player or for the team/faction of the particular player.

In one particular implementation, a player may have to gather virtual energy as part of the parallel reality game. As depicted in FIG. 5, virtual energy 550 can be scattered at different locations in the virtual world 510. A player can collect the virtual energy 550 by traveling to the corresponding location of the virtual energy 550 in the actual world 500. The virtual energy 550 can be used to power virtual items or to perform various game objectives in the game. A player that loses all virtual energy 550 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Figure 6:
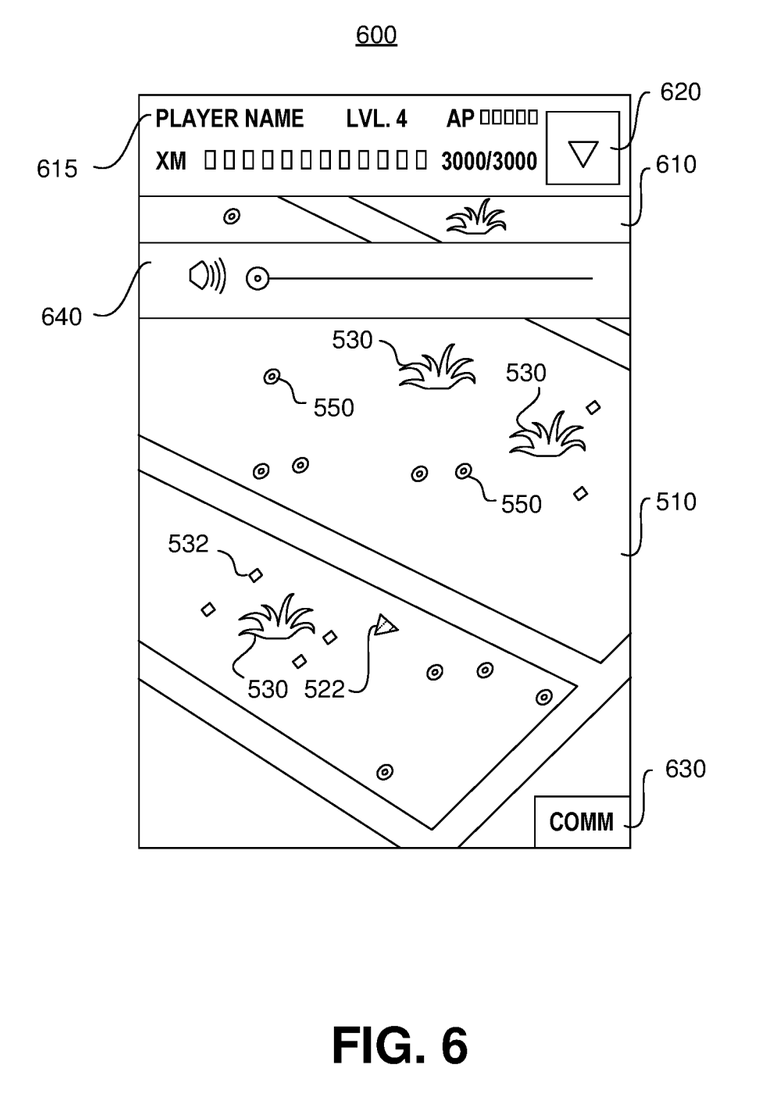
FIG. 6 depicts an exemplary game interface of a parallel reality game, according to one embodiment.

FIG. 6 depicts one embodiment of a game interface 600 that can be presented on a display of a client device 110 as part of the interface between a player and the virtual world 510. The game interface 600 includes a display window 610 that can be used to display the virtual world 510 and various other aspects of the game, such as player position 522 and the locations of virtual elements 530, virtual items 532, and virtual energy 550 in the virtual world 510. The user interface 600 can also display other information, such as game data information, game communications, player information, client location verification instructions and other information associated with the game. For example, the user interface can display player information 615, such as player name, experience level and other information. The user interface 600 can include a menu 620 for accessing various game settings and other information associated with the game. The user interface 600 can also include a communications interface 630 that enables communications between the game system and the player and between one or more players of the parallel reality game.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location based game. As a result, the user interface 600 can include a plurality of non-visual elements that allow a user to interact with the game. For instance, the game interface can provide audible notifications to the player when the player is approaching a virtual element or object in the game or when an important event happens in the parallel reality game. A player can control these audible notifications with audio control 640. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Generating Stereo Data

Figure 7:
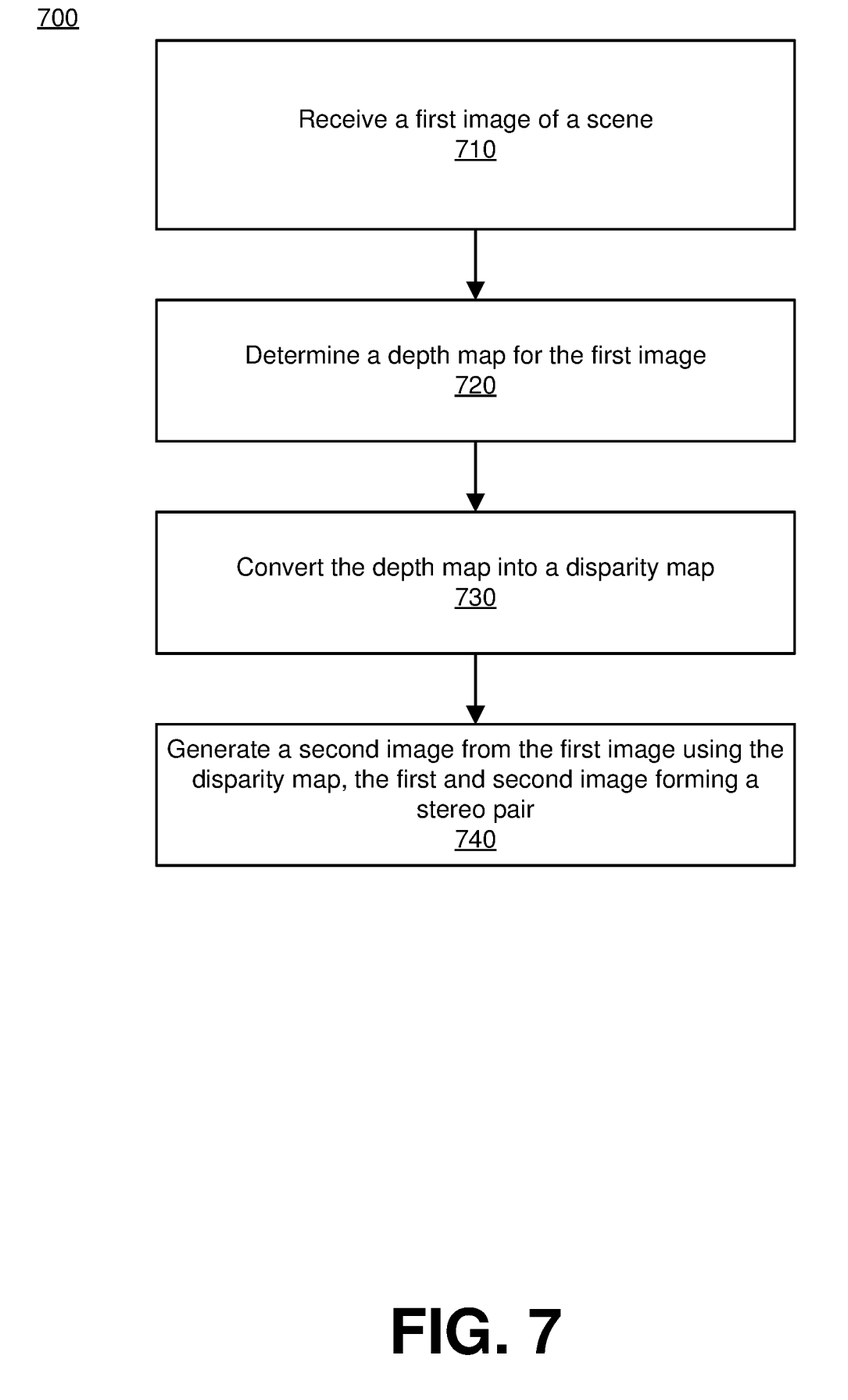
FIG. 7 illustrates an example computer system suitable for use in the networked computing environment of FIG. 1, according to one embodiment.

FIG. 7 is a flowchart describing a general process 700 of generating stereo image data using monocular image data, in accordance with one or more embodiments. The process 700 results in a stereo image pair including an input image and a generated image. As described herein the process 700 is performed by the model training system 140. In other embodiments, the process 700 may be performed on other computing devices, such as the client device 110 or the game server 120. Furthermore, some embodiments of the process 700 may include different or additional steps, perform steps in different orders, or perform one or more steps in parallel.

In the embodiment shown, the process 700 includes the model training system 140 receiving 710 a first image of a scene. The first image of the scene may be captured by a camera that is a component of the model training system 140 or external to the model training system 140. The first image may be a single image captured by the camera or alternatively a frame from video being captured by the camera. Furthermore, the first image may be one of a set of monocular images intended for generating a training set of stereo image pair using the process 700.

The process 700 includes the model training system 140 determining 720 a depth map for the image. For instance, the model training system 140 may determine the depth map using a pre-trained monocular depth estimation model, as described above with reference to the depth estimation module 410.

The process 700 also includes the model training system 140 converting 730 the depth map into a disparity map. For instance, the model training system 140 may convert the depth map to a disparity map by applying a disparity estimation function to the depth map, as described above with reference to the disparity map module 420. The model training system 140 may additionally apply a sharpening process to the disparity map, as described above with reference to the sharpening module 430.

The process 700 further includes the model training system 140 generating 740 a second image from the first image using the disparity map where the first and second image form a stereo pair. For instance, the first and second image may be respective left and right images of a stereo pair or vice versa. The model training system 140 may generate the second image by forward warping the pixels of the first image according to a transformation defined by the disparity map, as described above with reference to the stereo synthesis module 440. For example, the model training system 140 may forward warp the first image by shifting individual pixels of the first image by a disparity value in the disparity map corresponding to the individual pixels. After forming the stereo pair including the first and second image, the model training system 140 may use the stereo pair to generate a training set of stereo image pairs for training a stereo depth estimation model, as described above with reference to the training module 470.

The model training system 140 may perform further processing on the generated second image. For instance, to correct for occlusion holes as described above with reference to the occlusions module 450 or to resolve pixel conflicts as described above with reference to the collisions module 460. The generated second image may be used with the original image as a stereo pair for training a depth estimation or stereo matching model.

Example Computing System

Figure 8:
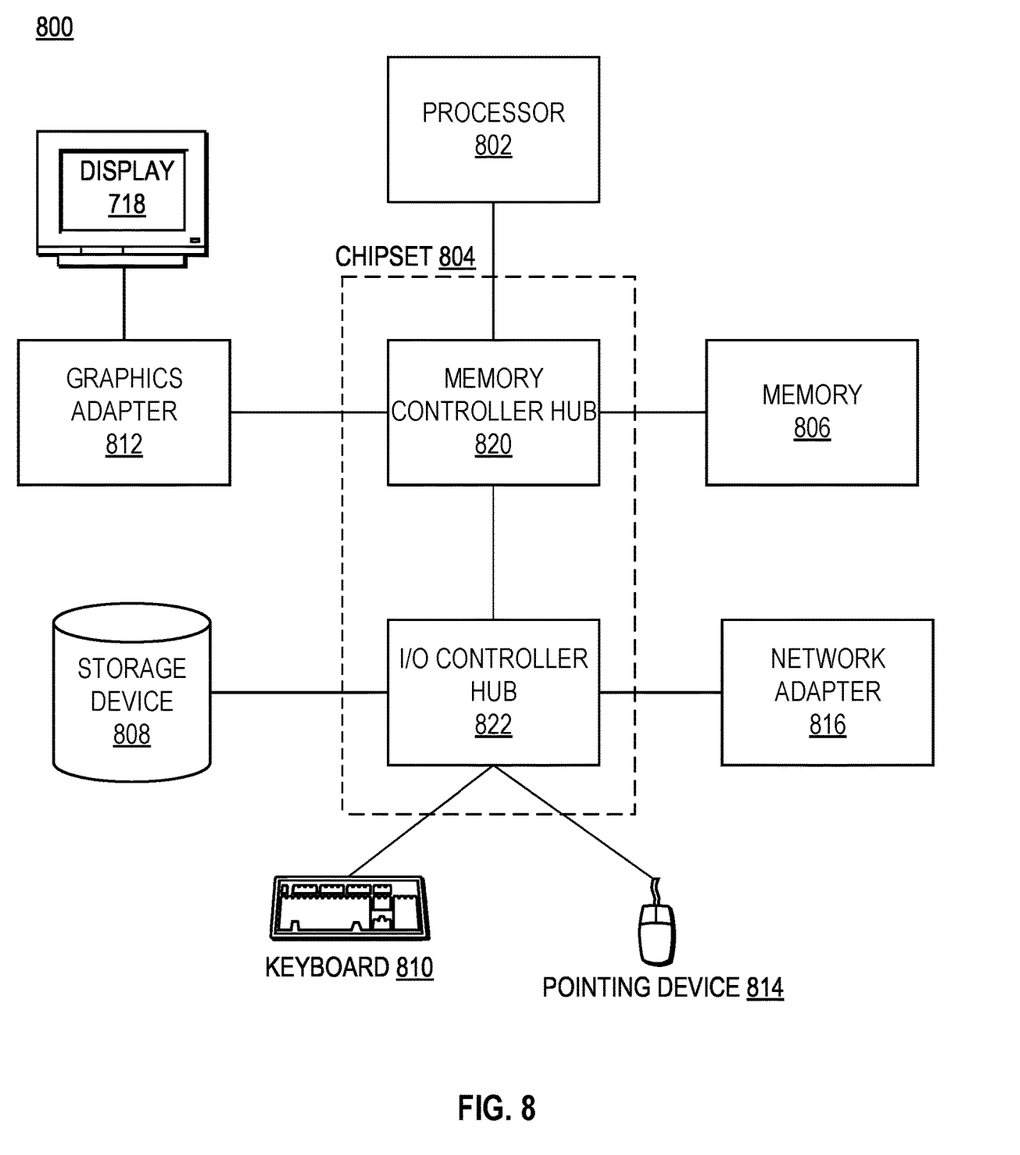
FIG. 8 illustrates an example architecture of a computing device, according to one embodiment.

FIG. 8 illustrates example architecture of a computing device, according to one embodiment. Although FIG. 8 depicts a high-level block diagram illustrating physical components of a computer used as part or all of one or more entities described herein, in accordance with an embodiment, a computer may have additional, less, or variations of the components provided in FIG. 8. Although FIG. 8 depicts a computer 800, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 8 are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In some embodiments, the computer 800 includes one or more communication buses for interconnecting these components. The one or more communication buses optionally include circuitry (sometimes called a chipset) that interconnects and controls communications between system components.

The storage device 808 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 808 can also be referred to as persistent memory. The pointing device 814 may be a mouse, track ball, or other type of pointing device, and is used in combination with the keyboard 810 to input data into the computer 800. The graphics adapter 812 displays images and other information on the display 818. The network adapter 816 couples the computer 800 to a local or wide area network.

The memory 806 holds instructions and data used by the processor 802. The memory 806 can be non-persistent memory, examples of which include high-speed random access memory, such as DRAM, SRAM, DDR RAM, ROM, EEPROM, flash memory.

As is known in the art, a computer 800 can have different or other components than those shown in FIG. 8. In addition, the computer 800 can lack certain illustrated components. In one embodiment, a computer 800 acting as a server may lack a keyboard 810, pointing device 814, graphics adapter 812, or display 818. Moreover, the storage device 808 can be local or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 808, loaded into the memory 806, and executed by the processor 802.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for verifying an account with an on-line service provider corresponds to a genuine business. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

We claim:

1. A computer-implemented method comprising:
   receiving a first image of a scene;
   determining a depth map for the first image;
   converting the depth map into a disparity map; and
   generating, using the disparity map, a second image from the first image, the first and second images forming a stereo image pair, wherein generating comprises:
      forward warping pixels of the first image using the disparity map, and filling an occlusion hole in the second image using a texture from a third image randomly selected from a set of images including the first image and the third image.

2. The computer-implemented method of claim 1, wherein filling the occlusion hole further comprises:
   generating a fourth image by performing color transfer between the first image and the third image; and
   replacing pixels of the occlusion hole in the second image with pixels at corresponding positions in the fourth image.

3. The computer-implemented method of claim 1, wherein generating the second image further comprises resolving a collision between a first pixel and a second pixel of the first image that both correspond to a position in the second image, the resolving of the collision comprising:
   comparing a first disparity in the disparity map corresponding to the first pixel to a second disparity in the disparity map corresponding to the second pixel; and
   responsive to determining, based on the comparison, that the first disparity is higher than the second disparity, using the first pixel at the position in the second image.

4. The computer-implemented method of claim 1, wherein converting the depth map into the disparity map comprises:
   applying a disparity estimation function to a plurality of depth values included in the depth map, the disparity estimation function simulating a plurality of camera focal lengths.

5. The computer-implemented method of claim 4, wherein applying the disparity estimation function comprises:
determining a disparity value of the disparity map corresponding to a depth value of the depth map by:
determining a ratio of a maximum depth value to the depth value; and
applying a scaling factor to the ratio, the scaling factor randomly sampled from a range over a minimum disparity value to a maximum disparity value.

6. The computer-implemented method of claim 1, wherein generating the second image further comprises:
identifying a pixel in the second image as a flying pixel responsive a disparity value in the disparity map corresponding to the pixel having an edge filter response exceeding a response threshold; and
responsive to identifying the flying pixel, adjusting the disparity value corresponding to the pixel using an additional disparity value corresponding to a non-flying pixel in the disparity map.

7. The computer-implemented method of claim 1, further comprising:
training a depth estimation model to predict depth maps for single images using the stereo image pair.

8. The computer-implemented method of claim 7, further comprising:
receiving an additional image of an additional scene;
determining an additional depth map for the additional image using the trained stereo depth estimation model; and
displaying the additional image with virtual content using the additional depth map.

9. The computer-implemented method of claim 1, further comprising:
training a stereo matching model to determine per-pixel displacement for stereo image pairs using the stereo image pair.

10. The computer-implemented method of claim 1, wherein determining the depth map comprises:
generating the depth map using a pretrained depth estimation model.

11. The computer-implemented method of claim 1, wherein determining the depth map comprises:
generating the depth map using a pretrained depth estimation model.

12. A non-transitory computer-readable storage medium storing instructions that, when executed by a computing device, cause the computing device to perform operations comprising:
receiving a first image of a scene;
determining a depth map for the first image;
converting the depth map into a disparity map; and
generating, using the disparity map, a second image from the first image, the first and second images forming a stereo image pair, wherein generating comprises:
forward warping pixels of the first image using the disparity map, and filling an occlusion hole in the second image using a texture from a third image randomly selected from a set of images including the first image and the third image.

13. The non-transitory computer-readable storage medium of claim 12, wherein filling the occlusion hole comprises:
generating a fourth image by performing color transfer between the first image and the third image; and
replacing pixels of the occlusion hole in the second image with pixels at corresponding positions in the fourth image.

14. The non-transitory computer-readable storage medium of claim 12, wherein generating the second image further comprises resolving a collision between a first pixel and a second pixel of the first image that both correspond to a position in the second image, the resolving of the collision comprising:
comparing a first disparity in the disparity map corresponding to the first pixel to a second disparity in the disparity map corresponding to the second pixel; and
responsive to determining, based on the comparison, that the first disparity is higher than the second disparity, using the first pixel at the position in the second image.

15. The non-transitory computer-readable storage medium of claim 12, wherein converting the depth map into the disparity map comprises:
applying a disparity estimation function to a plurality of depth values included in the depth map, the disparity estimation function simulating a plurality of camera focal lengths.

16. A computer-implemented method comprising:
receiving a first image of a scene;
determining a depth map for the first image;
converting the depth map into a disparity map; and
generating, using the disparity map, a second image from the first image, the first and second images forming a stereo image pair, wherein generating comprises:
forward warping pixels of the first image using the disparity map, and resolving a collision between a first pixel and a second pixel of the first image that both correspond to a position in the second image, wherein resolving of the collision comprises:
comparing a first disparity in the disparity map corresponding to the first pixel to a second disparity in the disparity map corresponding to the second pixel, and
responsive to determining, based on the comparison, that the first disparity is higher than the second disparity, using the first pixel at the position in the second image.

17. The computer-implemented method of claim 16, wherein generating the second image further comprises filling an occlusion hole in the second image using a texture from a third image.

18. The computer-implemented method of claim 17, wherein the third image is randomly selected from a set of images including the first image and the third image.

19. The computer-implemented method of claim 18, wherein filling the occlusion hole comprises:
generating a fourth image by performing color transfer between the first image and the third image; and
replacing pixels of the occlusion hole in the second image with pixels at corresponding positions in the fourth image.

20. The computer-implemented method of claim 16, wherein converting the depth map into the disparity map comprises:
applying a disparity estimation function to a plurality of depth values included in the depth map, the disparity estimation function simulating a plurality of camera focal lengths.

21. The computer-implemented method of claim 20, wherein applying the disparity estimation function comprises:

determining a disparity value of the disparity map corresponding to a depth value of the depth map by:
  determining a ratio of a maximum depth value to the depth value; and
  applying a scaling factor to the ratio, the scaling factor randomly sampled from a range over a minimum disparity value to a maximum disparity value.

22. The computer-implemented method of claim 16, wherein generating the second image further comprises:
  identifying a pixel in the second image as a flying pixel responsive a disparity value in the disparity map corresponding to the pixel having an edge filter response exceeding a response threshold; and
  responsive to identifying the flying pixel, adjusting the disparity value corresponding to the pixel using an additional disparity value corresponding to a non-flying pixel in the disparity map.

23. The computer-implemented method of claim 16, further comprising:
  training a depth estimation model to predict depth maps for single images using the stereo image pair;
  receiving an additional image of an additional scene;
  determining an additional depth map for the additional image using the trained depth estimation model; and
  displaying the additional image with virtual content using the additional depth map.

24. The computer-implemented method of claim 16, further comprising:
  training a stereo matching model to determine per-pixel displacement for stereo image pairs using the stereo image pair.

25. A computer-implemented method comprising:
  receiving a first image of a scene;
  determining a depth map for the first image;
  converting the depth map into a disparity map by applying a disparity estimation function to a plurality of depth values included in the depth map, the disparity estimation function simulating a plurality of camera focal lengths; and
  generating, using the disparity map, a second image from the first image, the first and second images forming a stereo image pair.

26. The computer-implemented method of claim 25, wherein generating the second image comprises forward warping pixels of the first image using the disparity map.

27. The computer-implemented method of claim 26, wherein generating the second image further comprises filling an occlusion hole in the second image using a texture from a third image.

28. The computer-implemented method of claim 27, wherein the third image is randomly selected from a set of images including the first image and the third image.

29. The computer-implemented method of claim 28, wherein filling the occlusion hole further comprises:
  generating a fourth image by performing color transfer between the first image and the third image; and
  replacing pixels of the occlusion hole in the second image with pixels at corresponding positions in the fourth image.

30. The computer-implemented method of claim 25, wherein generating the second image further comprises resolving a collision between a first pixel and a second pixel of the first image that both correspond to a position in the second image, the resolving of the collision comprising:
  comparing a first disparity in the disparity map corresponding to the first pixel to a second disparity in the disparity map corresponding to the second pixel; and
  responsive to determining, based on the comparison, that the first disparity is higher than the second disparity, using the first pixel at the position in the second image.

31. The computer-implemented method of claim 25, wherein applying the disparity estimation function comprises:
  determining a disparity value of the disparity map corresponding to a depth value of the depth map by:
    determining a ratio of a maximum depth value to the depth value; and
    applying a scaling factor to the ratio, the scaling factor randomly sampled from a range over a minimum disparity value to a maximum disparity value.

32. The computer-implemented method of claim 25, wherein generating the second image further comprises:
  identifying a pixel in the second image as a flying pixel responsive a disparity value in the disparity map corresponding to the pixel having an edge filter response exceeding a response threshold; and
  responsive to identifying the flying pixel, adjusting the disparity value corresponding to the pixel using an additional disparity value corresponding to a non-flying pixel in the disparity map.

33. The computer-implemented method of claim 25, further comprising:
  training a depth estimation model to predict depth maps for single images using the stereo image pair;
  receiving an additional image of an additional scene;
  determining an additional depth map for the additional image using the trained depth estimation model; and
  displaying the additional image with virtual content using the additional depth map.

34. The computer-implemented method of claim 25, further comprising:
  training a stereo matching model to determine per-pixel displacement for stereo image pairs using the stereo image pair.

35. A computer-implemented method comprising:
  receiving a first image of a scene;
  determining a depth map for the first image;
  converting the depth map into a disparity map; and
  generating, using the disparity map, a second image from the first image, the first and second images forming a stereo image pair, wherein generating comprises:
    identifying a pixel in the second image as a flying pixel responsive a disparity value in the disparity map corresponding to the pixel having an edge filter response exceeding a response threshold, and
    responsive to identifying the flying pixel, adjusting the disparity value corresponding to the pixel using an additional disparity value corresponding to a non-flying pixel in the disparity map.

36. The computer-implemented method of claim 35, wherein generating the second image comprises forward warping pixels of the first image using the disparity map.

37. The computer-implemented method of claim 36, wherein generating the second image further comprises filling an occlusion hole in the second image using a texture from a third image.

38. The computer-implemented method of claim 37, wherein the third image is randomly selected from a set of images including the first image and the third image.

39. The computer-implemented method of claim 38, wherein filling the occlusion hole further comprises:
  generating a fourth image by performing color transfer between the first image and the third image; and replacing pixels of the occlusion hole in the second image with pixels at corresponding positions in the fourth image.

40. The computer-implemented method of claim 35, wherein generating the second image further comprises resolving a collision between a first pixel and a second pixel of the first image that both correspond to a position in the second image, the resolving of the collision comprising:
   comparing a first disparity in the disparity map corresponding to the first pixel to a second disparity in the disparity map corresponding to the second pixel; and
   responsive to determining, based on the comparison, that the first disparity is higher than the second disparity, using the first pixel at the position in the second image.

41. The computer-implemented method of claim 35, wherein converting the depth map into the disparity map comprises:
   applying a disparity estimation function to a plurality of depth values included in the depth map, the disparity estimation function simulating a plurality of camera focal lengths.

42. The computer-implemented method of claim 41, wherein applying the disparity estimation function comprises:
   determining a disparity value of the disparity map corresponding to a depth value of the depth map by:
      determining a ratio of a maximum depth value to the depth value; and
      applying a scaling factor to the ratio, the scaling factor randomly sampled from a range over a minimum disparity value to a maximum disparity value.

43. The computer-implemented method of claim 35, further comprising:
   training a depth estimation model to predict depth maps for single images using the stereo image pair;
   receiving an additional image of an additional scene;
   determining an additional depth map for the additional image using the trained depth estimation model; and
   displaying the additional image with virtual content using the additional depth map.

44. The computer-implemented method of claim 35, further comprising:
   training a stereo matching model to determine per-pixel displacement for stereo image pairs using the stereo image pair.

* * * * *